United States Patent [19]

Washburn et al.

[11] 4,043,823

[45] Aug. 23, 1977

[54] LIGHTWEIGHT SILICON OXYNITRIDE

[75] Inventors: Malcolm E. Washburn, Princeton; Stephen D. Hartline, Shrewsbury, both of Mass.

[73] Assignee: Norton Company, Worcester, Mass.

[21] Appl. No.: 597,821

[22] Filed: July 21, 1975

[51] Int. Cl.$^2$ .............................................. C04B 35/48
[52] U.S. Cl. .................................... 106/40 R; 106/65; 106/73.5
[58] Field of Search .................... 106/55, 73.5, 40 R, 106/41; 423/325, 385

[56] References Cited

U.S. PATENT DOCUMENTS

| | | | |
|---|---|---|---|
| 2,553,759 | 5/1951 | Geiger | 106/41 |
| 3,258,349 | 6/1966 | Scott | 106/55 |
| 3,356,513 | 12/1967 | Washburn | 106/55 |
| 3,639,101 | 2/1972 | Washburn | 106/55 |
| 3,679,444 | 7/1972 | Washburn | 106/55 |

*Primary Examiner*—J. Poer
*Attorney, Agent, or Firm*—Oliver W. Hayes

[57] ABSTRACT

A lightweight insulating refractory shape is made of $Si_2ON_2$ having a density of less than 50% of theoretical, a relatively high compressive strength, a low thermal conductivity and high resistance to attack by chlorine, fused chlorides and molten aluminum.

7 Claims, 1 Drawing Figure

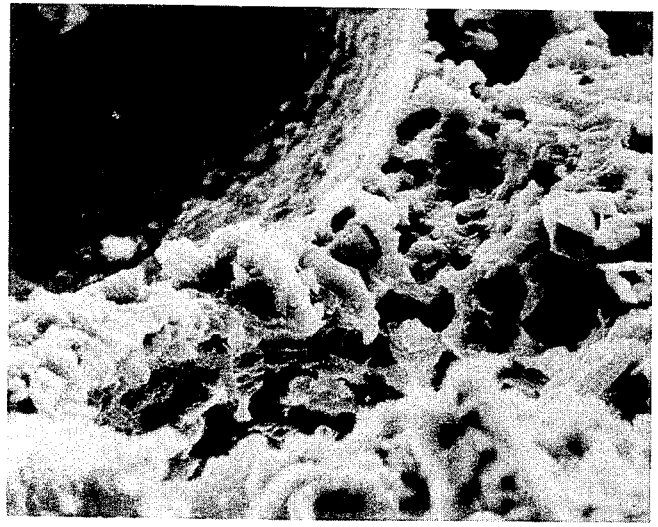

LIGHTWEIGHT SILICON OXYNITRIDE

BACKGROUND OF THE INVENTION

In the recently issued patent to Jacobs 3,785,941 (assigned to Aluminum Company of America) there is described a refractory material for the manufacture of electrolytic cells in which aluminum is produced by the electrolysis of aluminum chloride in a molten salt mixture of sodium chloride, lithium chloride and aluminum chloride. A preferred refractory for such cells is described as being silicon oxynitride ($Si_2ON_2$) since it has the ability to resist the highly corrosive atmosphere resulting from the presence, in the electrolysis cell, of the molten salts, molten aluminum and chlorine gas. Such silicon oxynitride can be made in accordance with Washburn U.S. Pat. Nos. 3,356,513, 3,639,101 and 3,679,444 assigned to Norton Company. While the above patents provide a product which is extremely resistant to the environment existing in the electrolysis cell, the product has a thermal conductivity which is relatively high, being on the order of 35 to 40 BTU inch/hr./ft.$^2$/° F. at a density of about 75% of theoretical thereby undesirably increasing the heat loss from the electrolysis cell during its operation.

Accordingly, it is a principal object of the present invention to provide a refractory silicon oxynitride shape which is resistant to the kind of corrosive atmosphere present in aluminum chloride electrolysis cell but which has a greatly decreased thermal conductivity.

THE PRIOR ART

In addition to the Jacobs patent and the Washburn patents mentioned above, there are several other patents (discussed briefly below) which are more or less pertinent to the present invention.

McGahan 3,175,918 describes the formation of a cellular silicon carbide article wherein a mixture of silicon carbide grit, resin binder and small phenolic resin spheres is fired to carbonize the resin. The product is then siliconized to convert the whole product to a porous silicon carbide mass. While the disclosure in this patent apparently also contemplates the substitution of some of the silicon carbide grit by a hard metallic nitride the patent does not describe the conversion of the pore forming material to a nitride. Scott U.S. Pat. No. 3,258,349 describes (Example IV) a process for making a porous silicon nitride product by mixing fine silicon powder and polystyrene beads. The mix is fired at 600° C. to burn out the beads and is then nitrided at 1390° C. to convert the silicon to silicon nitride.

There are other patents directed to various refractory bubbles such as U.S. Pat. No. 3,367,743 to Matchen which shows the use of zirconium oxide bubbles as an insulation with the alternative conversion of the zirconium oxide, while still in the bubble form, to either a boride or a nitride. Typical of the patents that are directed to hollow alumina bubbles is Horsefield U.S. Pat. No. 1,871,793. The Robie U.S. Pat. No. 2,806,772 describes a porous abrasive body incorporating porous glass bonded with a resin to the abrasive particles, none of which have been converted to a nitride however. Meurice et al U.S. Pat. No. 2,691,598 shows tiny hollow spheres of fly ash incorporated in a binder such as kaolin and bentonite which is fired to form an insulating brick but there is no nitride formation during the firing.

SUMMARY OF THE INVENTION

In a preferred embodiment of the present invention the excellent chemical resistance of silicon oxynitride is utilized in a refractory brick and the density of the brick is drastically lowered by incorporating, in the raw batch used to form the silicon oxynitride, small siliceous bubbles which are converted, during the silicon oxynitride reaction formation, to bubbles of silicon oxynitride. The reaction product is a lightweight, low density material having a low thermal conductivity (less than 20 BTU inch/hr./ft.$^2$/° F. at 1170° F.) and a high resistance to attack by molten aluminum, molten metallic chlorides and chlorine. The product consists essentially of silicon oxynitride with only minimal amounts of silica or silicon nitride and only small quantities of additional phases, these other phases being complex compounds of carbon, silicon, nitrogen, boron and calcium with perhaps some sodium and aluminum.

In practicing the present invention, a raw batch is prepared by mixing silicon and $SiO_2$ to satisfy the following equation when the product is fired in a nitrogen atmosphere:

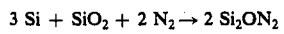

$$3\ Si + SiO_2 + 2\ N_2 \rightarrow 2\ Si_2ON_2$$

The silicon is a finely powdered product of relatively high purity and the silica is in the form of powdered pure silica, a small quantity of fume silica and the desired amount of glass bubbles containing a majority of silica. The preferred type of bubble contains about 75% silica and has a chemical composition comparable to normal window glass. In addition a promoter, such as calcium oxide or calcium fluoride, is added as taught in Washburn U.S. Pat. Nos. 3,679,444 and 3,356,513. By proper adjustment of the constituents of the mix essentially all of the contents of the mix are converted to silicon oxynitride to provide a strong continuous silicon oxynitride matrix which contains silicon oxynitride hollow spheres as part of the matrix. While the spheres are not completely closed (having ruptured during the nitriding operation) they are sufficiently closed to provide a remarkable resistance to attack by the corrosive atmosphere encountered in aluminum chloride electrolysis. The presence of the spheres provides a very high insulation value as well.

The drawing is a photomicrograph of a fracture surface of a product of the invention.

DETAILED DESCRIPTION OF THE INVENTION

A raw batch which can be nitrided to form silicon oxynitride is prepared, this batch containing a quantity of glass bubbles adjusted to give the final desired density, strength and insulating properties for the product. Generally the percentage of glass bubbles, on a volume basis, may range between about 10% to about 70%. At the lower percentage, obviously, the insulating value is not as high but the strength of the product is considerably greater; at the high percentages of bubbles the insulating value is optimum but the strength is lowest. In addition the cross-sectional composition of the refractory brick can be varied so that at one surface there can be essentially no bubbles, giving a dense structure having the highest corrosion resistance, with the bubble content increasing outwardly to provide maximum insulating effect.

After the raw batch has been prepared it is formed into the raw brick, preferably under conditions which give a maximum density of the raw materials in the spaces between the glass bubbles so as to provide maximum density therebetween. This high density gives the greatest possible strength to the continuous matrix between the voids upon nitriding of the bubbles.

The pore size of silicon oxynitride shapes made in accordance with the above cited Washburn patents has been found to have an average of 2 microns with large pores up to 20 microns and fine pores as small as .2 microns. The matrix of the insulating refractory described in this invention would exhibit similar pore size and distribution.

In order that one skilled in the art may practice the invention there are set forth below several preferred methods of making the product of the present invention.

EXAMPLE 1

A raw batch was prepared by mixing together the following constituents:

| | |
|---|---|
| −200 mesh silicon powder | 358 grams |
| −200 mesh fused silica (Glasrock) | 212 grams |
| silica fume having particles of .5 microns and below | 30 grams |
| calcium oxide promoter | 6 grams |
| glass bubbles | 95 grams |

The glass bubbles were sold by the 3M Company under the designation B-25B. The bubbles were formed of a boro silicate glass having the following approximate chemical composition:

| | | |
|---|---|---|
| 72–78% $SiO_2$ | 1–3% $Li_2O$ | < 1% $Al_2O_3$ |
| 4–8% CaO | 1–3% MgO | |
| 5–9% $Na_2O$ | 8–12% $B_2O_3$ | |

The particle size of the glass bubbles ranges from 20 to 120 microns having an average particle size of about 75μ. These bubbles have a loose pack density of .15 grams per cc. The softening point of the glass is 615° C. The mixture was thoroughly mixed with 425 cc. of water in a Hobart blender at the lowest blender speed to provide a free-flowing semi-liquid mixture. This mixture was then poured into a wooden mold, with hand vibration to assure compact settling of the silicon and silica particles between the glass bubbles. After drying in air overnight at about 80° C. for about 16 hours the green brick was removed from the mold and was fired in a nitrogen atmosphere in accordance with the techniques described in Washburn U.S. Pat. No. 3,639,101. A preferred firing cycle is as follows:

Room temperature to 1280° C. — 30 hours
Hold at 1280° C. for 16 hours
1280° C. - 1360° C. 2 hours
Hold at 1360° C. for 30 hours
1360° C. - 1390° C. 1 hour
Hold at 1390° C. for 15 hours
1390° C - 1420° C. 1 hour
Hold at 1420° C. for 15 hours
Cooled to room temperature for 4 days After firing the product was subjected to a number of tests. It had a final density of 0.9 grams per cc., (about 33% of theoretical) a crushing strength of 3500 p.s.i., a thermal conductivity of 7.4 BTU inch/hr./ft.$^2$/°F. at 640° F. The product had a volume percent of pores over 20 microns which was greater than 50 percent of the total volume. A sample of the fired brick was exposed to chlorine gas and the fused chloride environment typical of an aluminum chloride electrolysis cell and the brick showed excellent resistant to attack. When subjected to X-ray diffraction analysis and nitrogen analysis the product had the following calculated composition: 86% $Si_2ON_2$, 1-½% β $Si_3N_4$, 12-½% alpha cristabolite ($SiO_2$). While X-ray did not indicate the presence of any other crystalline phases it is believed that, from other analytical test results, that there was present a high temperature glassy phase containing boron, silicon, sodium, and perhaps some nitrogen. Spectrographic analysis for the final product showed the presence of the following elements:

Silicon, sodium, boron, aluminum, magnesium, calcium and iron. Lithium which was present in the green mix was not detected after firing.

EXAMPLE 2

To eliminate the excess cristobalite in the body, resulting from the glass bubbles, a corrected mix was made. In this mix 65 percent of the glass bubble weight was assumed to be available for reaction with silicon metal to form silicon oxynitride. A raw batch was prepared with the following constituents:

| | |
|---|---|
| −200 mesh silicon powder | 354.0 g |
| −200 mesh fused silica | 112.5 g |
| silica fume | 30.0 g |
| calcium fluoride | 6.0 g |
| glass bubbles (65% silica) | 150.0 g |

After forming and firing as in Example 1, the body was tested for density, crush strength, and composition. It had a fired density of 0.67 g/cc and a crush strength of 920 p.s.i. Combined X-ray and nitrogen analysis indicated a composition of:

87.7% $Si_2ON_2$
5.0% β $Si_3N_4$
7.3% α Cristobalite

This had a density of about 25% of theoretical.

EXAMPLE 3

To demonstrate the feasibility of organic pore inducers, a raw batch with the following constituents was prepared:

| | |
|---|---|
| −200 mesh silicon powder | 431.5 g |
| −200 mesh fused silica | 256.0 g |
| silica fume | 36.6 g |
| calcium oxide | 7.3 g |
| polystyrene beads (< 3/32" dia.) | 30.6 g |

This mix was formed by hand vibration after the addition of 380 ml. water. The piece was dried and burnoff of the polystyrene was accomplished after several hours in air at 500° C. After firing as in Example 1, the body had a density of 0.79 g/cc (29% of theoretical) and a crush strength of 710 p.s.i.

EXAMPLE 4

Another body was made with alumina bubbles of the type E-163 as sold by the Norton Company. The raw batch consisted of:

| | |
|---|---|
| −200 mesh silicon powder | 454.2 g |
| −200 mesh fused silica | 269.4 g |
| silica fume | 38.5 g |
| calcium oxide | 7.7 g |

| -continued | |
|---|---|
| alumina bubbles (E-163, −4+66 mesh) | 854.2 g |

After forming and firing as in Example 1, the body had a density of 1.45 g/cc and a crush strength of 3330 p.s.i. This density was 44% of theoretical density. X-ray showed essentially all alumina and $Si_2ON_2$.

EXAMPLE 5

A sample containing 69.2 volume percent glass bubbles was made by mixing the following constituents:

| | |
|---|---|
| −200 mesh silicon powder | 295.0 g |
| −200 mesh fused silica | 175.0 g |
| silica fume | 25.0 g |
| calcium fluoride | 5.0 g |
| glass bubbles | 150.0 g |

After forming and firing as in Example 1, the body had a density of 0.61 g/cc (about 22.2% theoretical), a crush strength of 410 p.s.i., and a thermal conductivity of 4.3 BTU inch/hr./ft.$^2$/°F. at 530° F. Combined X-ray diffraction and nitrogen analysis indicated a composition of:

66.3% $Si_2ON_2$
4.2% $\beta$ $Si_3N_4$
29.5% $\alpha$ Cristobalite and other phases (by difference).

The fracture plane of the product of Example 1 was examined under a microscope and a photomicrograph was taken of a fracture section of the product at 2000X to give the picture reproduced in the drawing. This clearly shows the relatively dense silicon oxynitride structure extending between the bubbles with the large, clearly defined, spherical void in the upper left hand corner of the the picture showing the locus of a glass bubble prior to nitriding.

While the above examples discuss several preferred types of pore forming bubbles or spheres other ceramic bubbles such as zirconia, magnesia, spinel and the like can be used. Other glass spheres which can be employed are those sold under the tradenames "cenospheres" (a fly ash), "Eccospheres" and "Celramic Nodules".

What is claimed is:

1. An insulating refractory body consisting essentially of $Si_2ON_2$, having less than 30% of $SiO_2$ and less than 15% $Si_3N_4$, said body having a density less than 50% of theoretical, at least 50% of the void volume of said body comprising spherical voids, said body being free of interparticular pores, as distinguished from matrix pores, and having a crush strength in excess of 500 p.s.i. and a thermal conductivity of less than 20 BTU inch/hr./ft.$^2$/°F. at 1170° F.

2. An insulating refractory body having a matrix consisting predominantly of $Si_2ON_2$, said body having a density less than 50% of theoretical, a crush strength in excess of 300 p.s.i. and a thermal conductivity of less than 20 BTU inch/hr./ft.$^2$/°F. at 640° F., said product including spherical bubbles of a ceramic material other than $Si_2ON_2$.

3. An insulating refractory body having a matrix consisting essentially of $Si_2ON_2$, said body having at least one face for contacting a corrosive environment which is relatively dense, having a specific gravity above 1.5 gr/cc, the majority of the remainder of the body having a density less than 1.00 gr/cc, a crush strength in excess of 3000 p.s.i. and a thermal conductivity of less than 8 BTU inch/hr./ft.$^2$/°F. at 640° F., said product including spherical voids.

4. The product of claim 3 wherein the percentage of voids increases with distance from the dense face.

5. The product of claim 1 wherein the product has a density less than .8 gr/cc and a thermal conductivity of less than 6 BTU inch/hr./ft.$^2$/°F. at 525° F.

6. The product of claim 1 wherein at least 33 volume percent of the spherical voids have a diameter less than 0.01 inch.

7. The product of claim 1 wherein the crush strength is in excess of 1000 p.s.i.

* * * * *